Dec. 28, 1943.  D. F. JORGENSEN  2,337,822
TRAP FOR GROUND BURROWING RODENTS
Filed Aug. 13, 1941
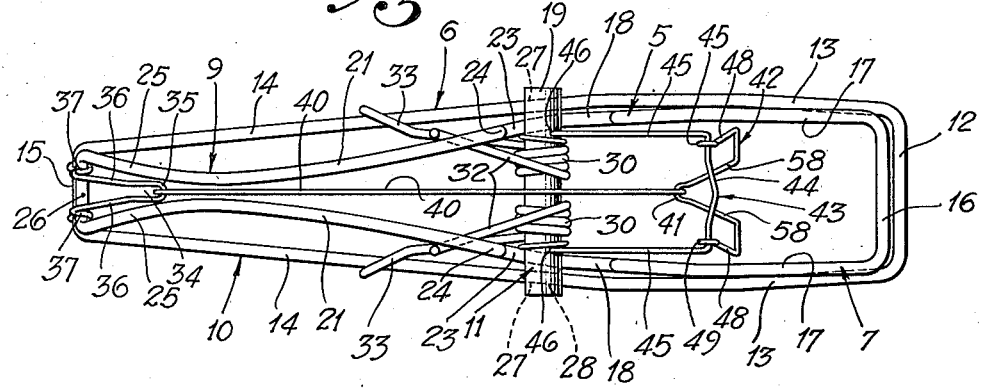
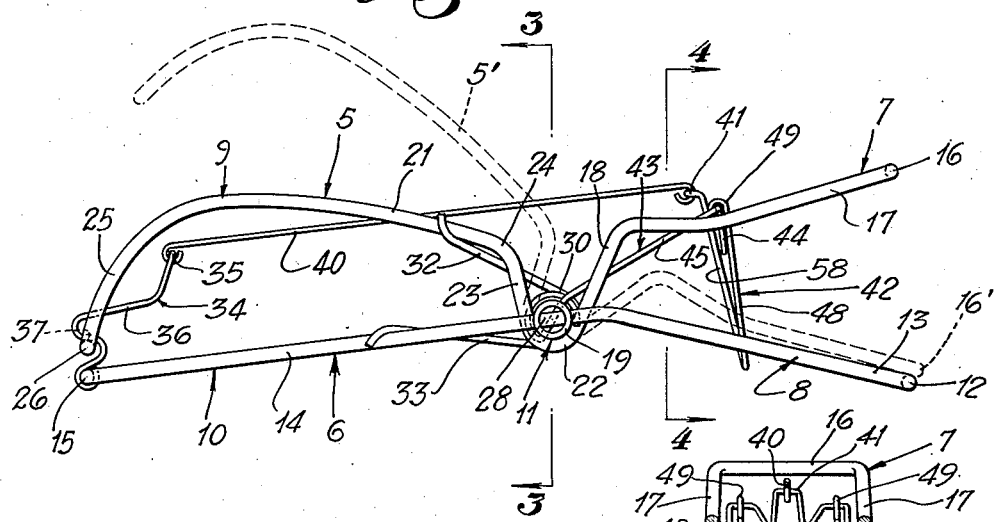
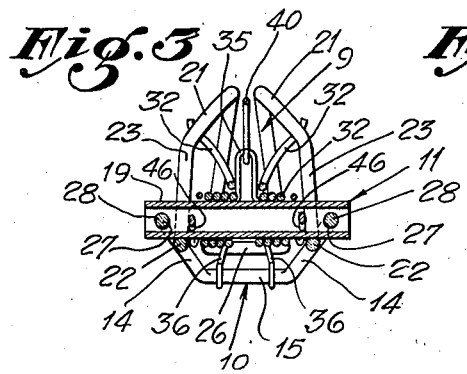
Inventor:
DAVID F. JORGENSEN;
By
Attorney.

Patented Dec. 28, 1943

2,337,822

UNITED STATES PATENT OFFICE 2,337,822

TRAP FOR GROUND BURROWING RODENTS

David F. Jorgensen, Temple City, Calif.

Application August 13, 1941, Serial No. 406,627

8 Claims. (Cl. 43—88)

My present invention is of a simple trap for burrowing rodents such as gophers and moles.

An object of the invention is to provide a trap of the above character which may be conveniently used by women and children, in that it does not require great strength or skill to set it, has no projecting teeth or prongs to cause personal injury, and may be readily actuated so as to release the trapped rodent without the necessity of touching the carcass of the animal.

A further object is to provide a trap so formed that it will securely hold and cause the death of the trapped rodent, without need for sharp teeth or prongs. The trap, accordingly, may be used without offense by persons to whom the sight of blood is offensive.

A further object is to provide a trap which is set by movement of two cooperating rearward parts which may be referred to as handles, and in such manner that the hands of the operator are not endangered by close proximity to the jaws during the setting operation.

A further object is to provide a trap having latch means which may be manually held against release while the jaws of the trap are being placed in a desired position relative to the burrow of the rodent, for example, in the threshold of the burrow. A further object is to provide a trap which may be made entirely of round steel stock, including steel wire bent to shape so as to form the cooperating parts.

A further object is to provide a trap having handle parts of rounded form, without exposed sharp corners to strike the hands of the user.

Further objects and advantages of the invention will be brought out in the following part of the specification.

Referring to the drawing which is for illustrative purposes only:

Fig. 1 is a plan view drawn at slightly reduced scale, of a preferred form of my invention in "set" position.

Fig. 2 is a side elevation corresponding to Fig. 1.

Fig. 3 is a cross section taken as indicated by the line 3—3 of Fig. 2.

Fig. 4 is a cross section taken as indicated by the line 4—4 of Fig. 2.

In the preferred embodiment of my invention shown in the drawing I provide an upper member 5 and a lower member 6, the forward portion of the upper member 5 forming an upper jaw 7, and the forward portion of the lower member 6 forming a lower jaw 8. The rearward portions 9 and 10 of the members 5 and 6 are referred to as handles, since they provide a means by which force may be manually applied to set the trap and by which the trap may be moved or carried while it is in set condition so as to bring the open jaws 7 and 8 into a desired position, for example, within the opening of a burrow.

The upper and lower members 5 and 6 are bent from steel wires so that each forms an elongated loop, these elongated loops being joined intermediate their ends by hinge means 11, such hinge means accordingly defining the plane of separation between the jaws 7 and 8 and the handles 9 and 10, indicated by the line 3—3 of Fig. 2.

The lower jaw 8 comprises a relatively narrow cross bar 12 at the forward end thereof, and legs or side bars 13 which extend rearwardly from the end of the cross bar 12. Continuing back or leftward through the hinge means 11, these side bars 13 become the side bars 14 of the lower handle 10, the rear ends of which are joined by a cross bar 15.

The upper jaw 7 comprises a cross bar 16 at the forward end thereof, with legs or side bars 17 extending rearwardly from the ends thereof. In Figs. 1 and 2 the cross bars 12 and 16 are shown in full lines in the position thereof when the jaws 7 and 8 are open. By dotted lines 16' in Fig. 2, the position of the upper cross bar 16 is shown when the jaws 7 and 8 are in close relation. The portions 18 of the side bars 17 bend downward at a sharp angle and are then curved rearward and upward, thereby forming a reentrant or U-shaped bend which passes under a tubular hinge member 19, to cooperate with this tubular member 19 in forming the hinge means 11. The rearward continuations of the side bars 17 form the side bars 21 of the upper handle 9. From the curved portions 22 which extend under the tubular member 19, the forward portions 23 of the side bars 21 extend upward and then bend rearward as indicated at 24. The rearward parts 25 of the side bars 21 are curved downward and the ends thereof are joined by a cross bar 26. Also, the intermediate portions of the side bars 21 are curved inward toward each other as shown in Fig. 1, so that the upper handle 9 is given greater slenderness than the lower handle 10.

It has been described how the portions 18 and 23 of the side bars of the upper member 5 extend downwardly and under the tubular member 19 at 22, thereby permitting the upper member 5 to swing relatively to the tubular member 19, from the position thereof shown in full lines in Fig. 2 to the position thereof shown in dotted lines 5'. The tubular member 19 is fixed on the side bars of the lower member 6, there being openings 27 in the end portions of the tubular member 19 through which the intermediate sections 28 of the side bars of the lower member 6 pass.

Spring means 30 are provided for urging the jaws 7 and 8 from open to close relation, such spring means being coiled around the tubular member 19, as shown, and having extending ends 32 and 33 to respectively engage the side bars 21 and 14 of the upper and lower handles 9 and 10.

A latch 34 is swingably secured to the cross member 15 at the rear end of the handle 10 and is arranged to engage the cross bar 26 at the rear end of the upper handle 9. This latch 34 comprises a length of wire bent so as to form a fork having an upper rounded portion 35 and a pair of downwardly extending legs 36, each of which is curved to letter S form so as to provide shoulders 37 which will engage the upper face of the cross bar 26 as shown in Fig. 2. Release of the latch 34 is accomplished by swinging the same in clockwise direction from the position in which it is shown in Fig. 2. This is done through the use of a link 40 connected to the upper end 35 of the latch 34 and being extended forwardly to engage the upper portion 41 of a trigger 42 which is supported between the hinge means 11 and the forward ends of the jaws 7 and 8. The support for the trigger 42 comprises a U-shaped wire bracket 43 having a cross bar 44 and legs 45 extending rearwardly from the ends of the cross bar 44 to be received in openings 46, in the tubular member 19 of the hinge means 11. The trigger 42 consists of a wire frame having nearly vertical side members 48 with loops 49 at the upper ends thereof to engage the end portions of the cross bar 44. Projecting downwardly from its upper portion 41, the trigger 43 has intermediate portions 58 which cooperate with the side members 48 to form a barrier which will be engaged by the rodent as it moves leftward through the open space between the separated upper and lower jaws 7 and 8.

It will be noted that the latch 34 and also a portion of the link 40 are disposed in the space between the upper and lower handles 9 and 10. Being thus positioned, these members may be manually engaged after the trap is set, by merely extending one or more fingers into the open space between the handles 9 and 10, whereby disengagement of the latch 34 from the cross bar 26 may be prevented while the trap is being handled, and especially when the trap is being moved into a desired position relative to the mouth of a rodent burrow. The trap is so designed that the jaws 7 and 8 are elongated and are of such size that ordinarily they may be moved into the threshold or entrance opening of a rodent's burrow, but in some instances it may be necessary to slightly enlarge the opening so that the jaws may be moved thereinthrough. A further advantage of the invention is that sharp points are not exposed in the burrow to warn the rodent before he reaches the trigger. In fact, the cross bar 12 is the only part over which the rodent must pass before reaching the trigger 42.

Figs. 1 and 2 show the trap set. This is accomplished by swinging the handle members 9 and 10 toward each other, and then causing the latch 34 to engage the cross bar 26 at the rear end of the handle 9, this being accomplished by rotating the latch member 34 in counterclockwise direction after the handle 9 has been moved from its dotted line position 5' to the position in which it is shown in full lines in Fig. 2. Through the link 40, the counterclockwise rotation of the latch 34 is transmitted to the trigger 42, which will be then in the position in which it is shown in full lines in Figs. 1 and 2. This is accomplished without bringing the hands of the operator near the jaws 7 and 8. The trap, for purpose of setting, may be placed upon a hard surface such as a floor, the member 6 then serving as a base, and the handle 9 serving as a lever which is forced downward from the position indicated by dotted lines 5'.

When set, as shown in Fig. 2, the trap may be placed so that its open jaws 7 and 8 will project into the mouth of a burrow. This will bring the trigger 42 into the path of travel of the rodent and when he rotates the trigger 42 in clockwise direction from its set position, the link 40 will transmit clockwise movement to the latch to release the upper member 5 and permit the jaws to close upon the rodent, ordinarily at a point behind the transverse medial plane of the head. The release of the dead animal from the trap is accomplished without touching the same, merely by forcing the handle members 9 and 10 toward each other so as to open the jaws to permit the animal to fall therefrom.

I claim as my invention:

1. In a rodent trap of the character described, the combination of: an upper member and a lower member in coextensive relation, each of said members comprising an elongated wire loop having at the front end thereof a cross bar and side bars extending rearwardly from said cross bar, so as to form a U-shaped jaw at the front end of each of said members; hinge means connecting said members together at the rear ends of said jaws; spring means exerting a force to swing said jaws together and the rear ends of said members apart, the rear ends of said members being so formed that when they are swung toward each other there remains a space between them; and control means for said members comprising a latch engageable between said rear ends of said members to hold them together so that said jaws will be held apart against the action of said spring means, rodent engageable means disposed intermediate the ends of said members operative by a rodent, and means to transmit latch releasing movement from said rodent engageable means to said latch, a part of said control means being engageable in said space between said rear ends of said members to prevent release of said latch.

2. In a trap of the general class described, the combination of: a pair of elongated members, the forward ends of which comprise jaws and the rearward ends of which comprise handles swingable together and apart, one of said members intermediate its ends having a transverse hinge bar and the other of said members having intermediate its ends a U-shaped bend to pass under said hinge bar and swing thereon; spring means operative between said members to force said handles apart so that said U-shaped bend is held in contact with said hinge bar, and to rotate said members so as to move said jaws toward each other; a latch operative between said members to hold said jaws apart; and trigger means engageable by the animal or rodent to release said latch.

3. In a trap of the general class described, the combination of: a pair of elongated members, the forward ends of which comprise jaws and the rearward ends of which comprise handles swingable together and apart, one of said members intermediate its ends having a transverse hinge bar and the other of said members having intermediate its ends a U-shaped bend to pass under said hinge bar and swing thereon, said handles being longer than said jaws; spring means operative between said members to force said handles apart so that said U-shaped bend is held in contact with said hinge bar, and to rotate said members so as to move said jaws toward each other; a latch operative between said members to hold said jaws apart; and trigger means engageable by the animal or rodent to release said latch.

4. In a trap of the general class described, the combination of: a base member and an upper member in coextensive relation, the forward ends of said members comprising jaws and the rearward ends of said members comprising handles swingable together and apart, said base having intermediate its front and rear ends and in the horizontal plane defined by its intermediate portion a transverse hinge bar, and said upper member comprising an elongated loop having side bars formed to provide downwardly extending U-shaped bends to pass under said hinge bar and swing thereon; spring means operative between said members to force said handles apart so that said U-shaped bend is held in contact with said hinge bar, and to rotate said members so as to move said jaws toward each other; a latch operative between said members to hold said jaws apart; and trigger means engageable by the animal or rodent to release said latch.

5. In a trap of the general class described, the combination of: a base member and an upper member in coextensive relation, the forward ends of said members comprising jaws and the rearward ends of said members comprising handles swingable together and apart, said base having intermediate its front and rear ends and in the horizontal plane defined by its intermediate portion a transverse hinge bar, and said upper member comprising an elongated loop having side bars formed to provide downwardly extending U-shaped bends to pass under said hinge bar and swing thereon, and the rearward ends of said side bars being curved downwardly to give the handle portion of said upper member a rounded contour; spring means operative between said members to swing the jaws thereof toward each other; a latch operative between said members to hold said jaws apart; and trigger means engageable by the animal or rodent to release said latch.

6. In a trap for animals of the character of gophers and moles, the combination of: an upper member and a lower member in coextensive relation, each of said members comprising an elongated wire loop having at the front end thereof a cross bar and side bars extending rearwardly from said cross bar, so as to form a U-shaped jaw at the front end of each of said members, having between said side bars thereof a space to accommodate a portion of the head of the animal when said cross bars of said U-shaped jaws are clamped on the neck of the animal; hinge means connecting said members together at the rear ends of said jaws; spring means exerting a force to swing said jaws together and the rear ends of said members apart; and control means for said members comprising a latch engageable between said members to hold them together so that said jaws will be held apart against the action of said spring means, rodent engageable means disposed intermediate the ends of said members operative by a rodent, and means to transmit latch releasing movement from said rodent engageable means to said latch.

7. In a trap of the general class described, the combination of: a pair of elongated members, the forward ends of which comprise jaws and the rearward ends of which comprise handles swingable together and apart, there being hinge means on a transverse axis between said jaws and handles on which said members may swing, at least one of said members having a reentrant bend extending toward the other of said members so as to pass under said hinge means and swing thereon so that said reentrant bend forms a part of the articulation between said members; spring means operative between said members to force said handles apart so that said reentrant bend is held in contact with said hinge means, and to rotate said members so as to move said jaws toward each other; a latch operative between said members to hold said jaws apart; and trigger means engageable by the animal or rodent to release said latch.

8. In a trap of the general class described, the combination of: a pair of elongated members, the forward ends of which comprise jaws and the rearward ends of which comprise handles swingable together and apart, there being hinge means on a transverse axis between said jaws and handles on which said members may swing, at least one of said members having a portion which bends toward said hinge means and then passes thereunder so as to be rockable on the hinge means and form a part of the articulation between said members; spring means operative between said members to force said handles apart so that said bend portion is held in contact with said hinge means, and to rotate said members so as to move said jaws toward each other; a latch operative between said members to hold said jaws apart; and trigger means engageable by the animal or rodent to release said latch.

DAVID F. JORGENSEN.